United States Patent [19]

Dougherty

[11] Patent Number: 5,240,316
[45] Date of Patent: Aug. 31, 1993

[54] REFRIGERATED FLORAL DISPLAY CABINET

[76] Inventor: James Dougherty, 42 Montgomery St., P.O. Box 262, Tivoli, N.Y. 12583

[21] Appl. No.: 909,976

[22] Filed: Jul. 7, 1992

[51] Int. Cl.⁵ .............................................. A47F 3/04
[52] U.S. Cl. ........................... 312/236; 62/255; 47/48.5
[58] Field of Search ............. 312/236, 114, 116; 62/255, 256; 47/48.5, 27, 79, 41.12, 62

[56] References Cited

U.S. PATENT DOCUMENTS

| | | | |
|---|---|---|---|
| 1,891,559 | 12/1932 | Ryan | 312/236 |
| 2,441,463 | 5/1948 | Achs | 312/116 |
| 2,499,089 | 2/1950 | Brill et al. | |
| 2,657,545 | 11/1953 | Knight | |
| 2,863,302 | 12/1958 | Morris | |
| 3,135,568 | 6/1964 | Burkholder | |
| 3,850,486 | 11/1974 | Saxe | |
| 3,999,821 | 12/1976 | Moody et al. | |
| 4,458,501 | 7/1984 | Kooy | |
| 4,608,776 | 9/1986 | Kooy | |
| 4,608,835 | 9/1986 | Kooy | 62/256 |
| 4,899,487 | 2/1990 | Brownlee | 47/79 |
| 4,953,363 | 9/1990 | Primoxic | |
| 5,103,586 | 4/1992 | Farrell | 47/41.12 |

FOREIGN PATENT DOCUMENTS

| | | | |
|---|---|---|---|
| 0140453 | 5/1985 | European Pat. Off. | |
| 2734867 | 2/1979 | Fed. Rep. of Germany | 312/236 |
| 674608 | 6/1990 | Switzerland | 312/236 |

*Primary Examiner*—Kenneth J. Dorner
*Assistant Examiner*—Janet M. Long
*Attorney, Agent, or Firm*—Schmeiser, Morelle & Watts

[57] ABSTRACT

A display cabinet which refrigerates containers of flowers by forcing a flow of cold air into holes in the bottom of each container and up through the flowers stored therein. The containers of flowers are inserted into a plurality of openings in a product support stand which rests on top of a refrigerated area. The openings which do not have containers of flowers inserted therein are biased to a closed position. The flow of cold air is adjusted according to the number of containers inserted into the product support stand.

14 Claims, 3 Drawing Sheets

REFRIGERATED FLORAL DISPLAY CABINET

FIELD OF THE INVENTION

The present invention relates to refrigerated display cabinets and, more particularly, to display cabinets for the display of perishable goods such as flowers.

BACKGROUND OF THE INVENTION

Many techniques have been utilized to prolong the shelf life of cut flowers stored in display cabinets. These techniques commonly utilize a combination of refrigeration and hydration to preserve the displayed flowers for as long as possible.

A common type of refrigerated display cabinet is disclosed in a patent issued to Kooy in 1984, U.S. Pat. No. 4,458,501. Kooy discloses a display cabinet in which flower boxes filled with cut flowers and water are cooled from below by placing them into openings in a table suspended above a refrigerated area. In addition to cooling the cut flowers by refrigerating the water in the flower boxes, Kooy's display cabinet subjects the flowers in the flower boxes to a descending flow of cold air.

Although Kooy's display cabinet prolongs the shelf life of flowers stored therein to a certain degree, it suffers from several disadvantages. For example, Kooy's display cabinet is not energy efficient because a significant amount of refrigerated air is allowed to escape to the outside environment through empty openings in the tables suspended above the refrigerated area. Kooy's display cabinet also wastes energy by applying the flow of descending cold air to the entire display area rather than directing it only to those openings in the tables which actually contain flower boxes.

Another type of refrigerated display cabinet is disclosed in the patent issued to Primoxic in 1990, U.S. Pat. No. 4,953,363. Primoxic discloses a floral display cabinet in which perforated cups containing cut flowers are submerged into tubular manifolds containing a supply of water. The flowers in each cup are subjected to a flow of descending cold air in a manner similar to that disclosed by Kooy. Unfortunately, the display cabinet disclosed by Primoxic suffers from the aforementioned disadvantages because it utilizes a similar flow of descending cold air to refrigerate the flowers stored in each cup.

An additional disadvantage common to the display cabinets disclosed by Kooy and Primoxic is that they are expensive and costly to operate because of their large size. Consequently, these types of display cabinets are not suited for smaller stores having a limited sales volume.

Two main concerns relative to flower sales are the cost of refrigerating the flowers and their effective saleable life span. Weighed against these concerns is the need to display the flowers in an appealing way, and preferably allowing the consumer access to the product.

Because large refrigeration units such as those disclosed by Kooy and Primoxic are expensive, they are generally purchased only by florists or other stores that have substantial flower sales. Similarly, because the life span of flowers is limited, most stores that would have only limited sales volume cannot afford to sell fresh cut flowers.

For these reasons, flowers are generally not carried in most local stores such as drug stores, convenient stores or the like. Accordingly, the purchase of flowers is generally based upon a particular event because the purchaser has to make a conscious and planned decision and then often go out of the way to make the purchase. Virtually unavailable in the flower industry is the profitable, multiple location, limited volume sales that occur at local stores such as those mentioned above. These types of stores sell a variety of items, many of which are often at or near the point of purchase and are impulse related. Relative to the flower industry, this method can produce significant total sales even though the sales at each store may be limited. In order to effectively accomplish this method of marketing, the store owner must have access to a relatively inexpensive refrigeration unit which will extend the saleable life span of fresh cut flowers beyond what is presently possible with similarly priced units. Only then can the sale of fresh cut flowers through local stores be really profitable.

Accordingly, it is an object of this invention to provide a relatively inexpensive refrigeration unit for stores with varying sales volume.

It is also an object of this invention to provide a display cabinet that maximizes the shelf life of the flowers stored therein.

Another object of the invention is to provide a more energy efficient display cabinet by reducing the amount of refrigerated air lost to the outside environment and by applying the refrigerated air only to those areas of the display cabinet that actually contain flowers.

Further objects and advantages of the present invention will become apparent from the following detailed description and drawings.

SUMMARY OF THE INVENTION

The refrigerated display cabinet of the present invention includes a product support stand which has a plurality of openings for receiving and supporting containers of flowers. The flower containers are generally conical in shape and are tall enough to fully surround the flowers stored therein. Each of the containers can be formed out of plastic, foam or any suitable deformable material such as cellophane. The openings in the product support stand which do not contain an inserted flower container are automatically sealed by a flap that is biased to the closed position. When a flower container is inserted into one of the sealed openings, the flap is moved into an open position. The flaps are only slightly biased to prevent any damage to the flower container constructed out of a deformable material. Alternately, the openings which do not contain flower containers can be manually sealed by inserting a cap or plug into each opening.

Holes located toward the bottom of each inserted flower container allow a flow of cold air from a refrigerated area to circulate upwards through the enclosed flowers. A condenser, evaporator and fan produce and maintain the flow of cold air under positive pressure, forcing it up through the holes in each inserted flower container. However, the cold air will tend to settle and remain in the container and therefore only a small flow of air is necessary. A fan speed control adjusts the speed of the fan in accordance with the number of inserted flower containers.

The stems of the flowers in each inserted flower container may extend out of a hole in the bottom of the container and are submerged into a supply of water which covers the bottom of the refrigerated area.

Thus, the display cabinet of the present invention is inexpensive to own and operate and can be used almost anywhere. In addition, the display provides a customer with easy access to the flower containers stored therein; a customer simply removes a container of flowers from one of the openings in the product support stand and purchases the flowers, container and all. Furthermore, the cold air forced up inside the flower container increases the saleable life span of the flowers stored therein.

DETAILED DESCRIPTION OF THE INVENTION

Figure 1:
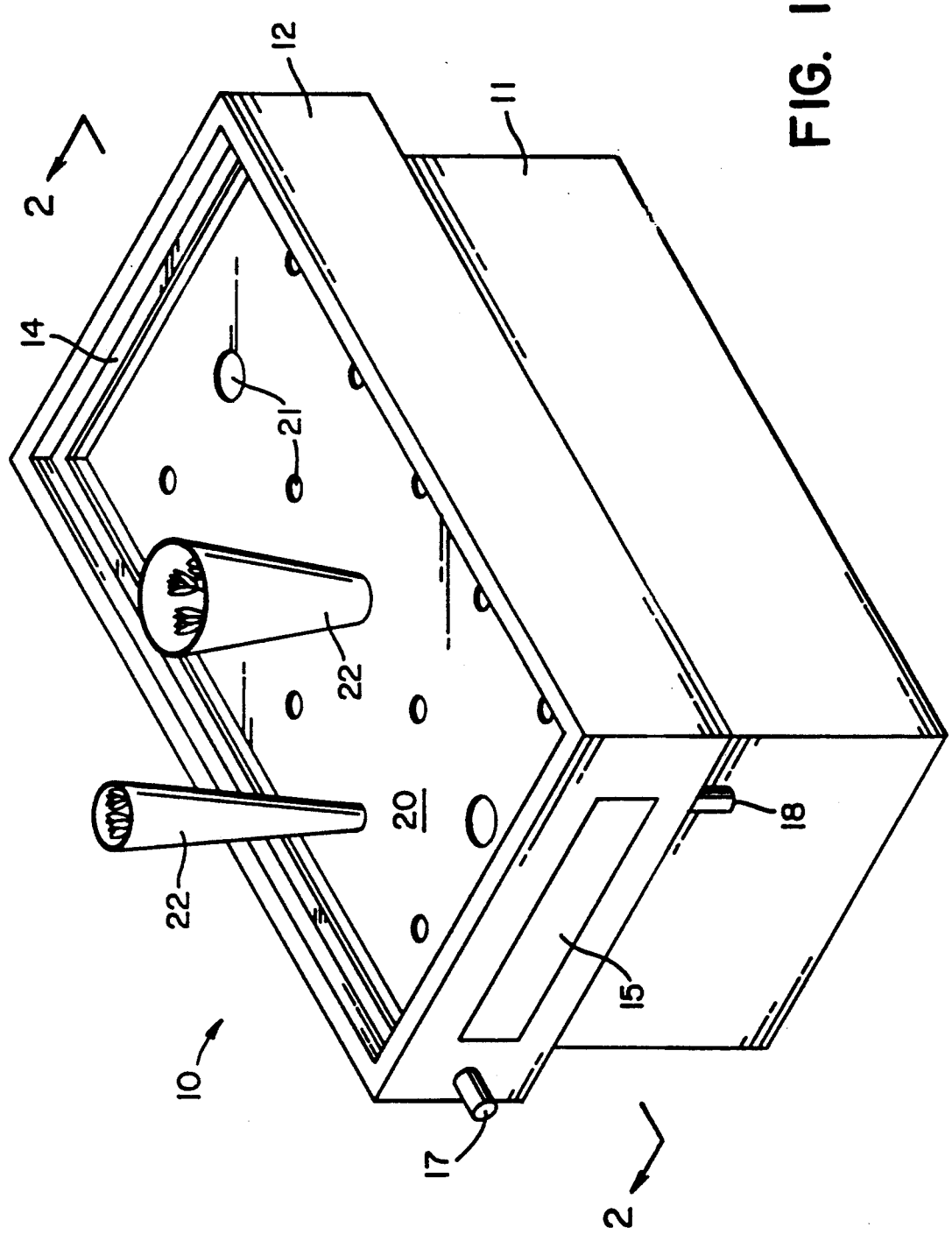
FIG. 1 illustration of a refrigerated floral display cabinet according to a preferred embodiment of the present invention.

A preferred embodiment of the refrigerated floral display cabinet of the present invention, generally designated as 10, is illustrated in FIG. 1. The display cabinet has a base 11, insulated side walls 12, insulated bottom 13, and a product support stand 20. A hollow air collection rim 14 extends around the entire top perimeter of the side walls 12.

Figure 3:
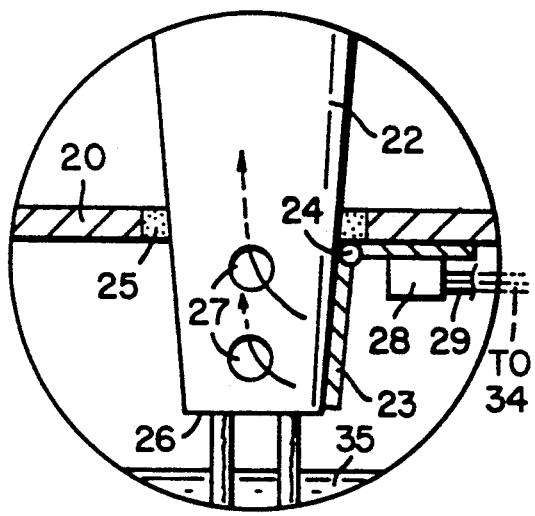
FIG. 3 illustrates an opening in the product support stand with a flower container inserted therein.
Figure 4:
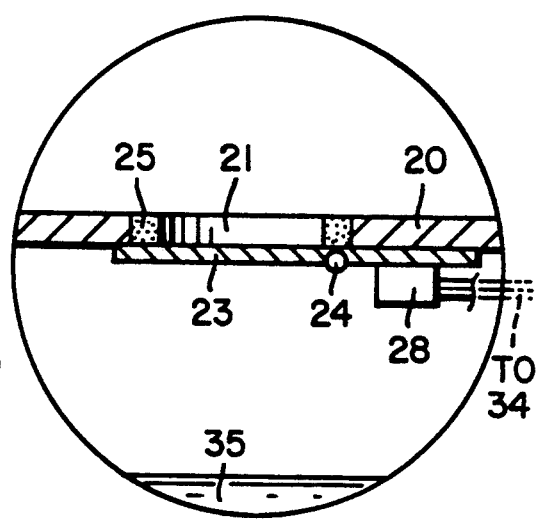
FIG. 4 illustrates an empty opening in the product support stand.

The product support stand 20 has a plurality of circular openings 21 for receiving conical product containers 22 containing flowers. Each opening 21, further illustrated in FIGS. 3 and 4, is automatically sealed by a flap 23 which is biased to the closed position under control of a spring 24. Each flap 23 is moved to the open position, as illustrated in FIG. 3, when a product container 22 is placed therein. When a flap is opened upon insertion of a product container, a flap position sensing device 28 is triggered producing an insertion signal 29. The flap position sensing device is preferably a switch connected to either the spring 24 or flap 23.

The perimeter of each opening 21 is surrounded by a foam ring 25 which provides a seal against the outside of each inserted product container.

Figure 2:
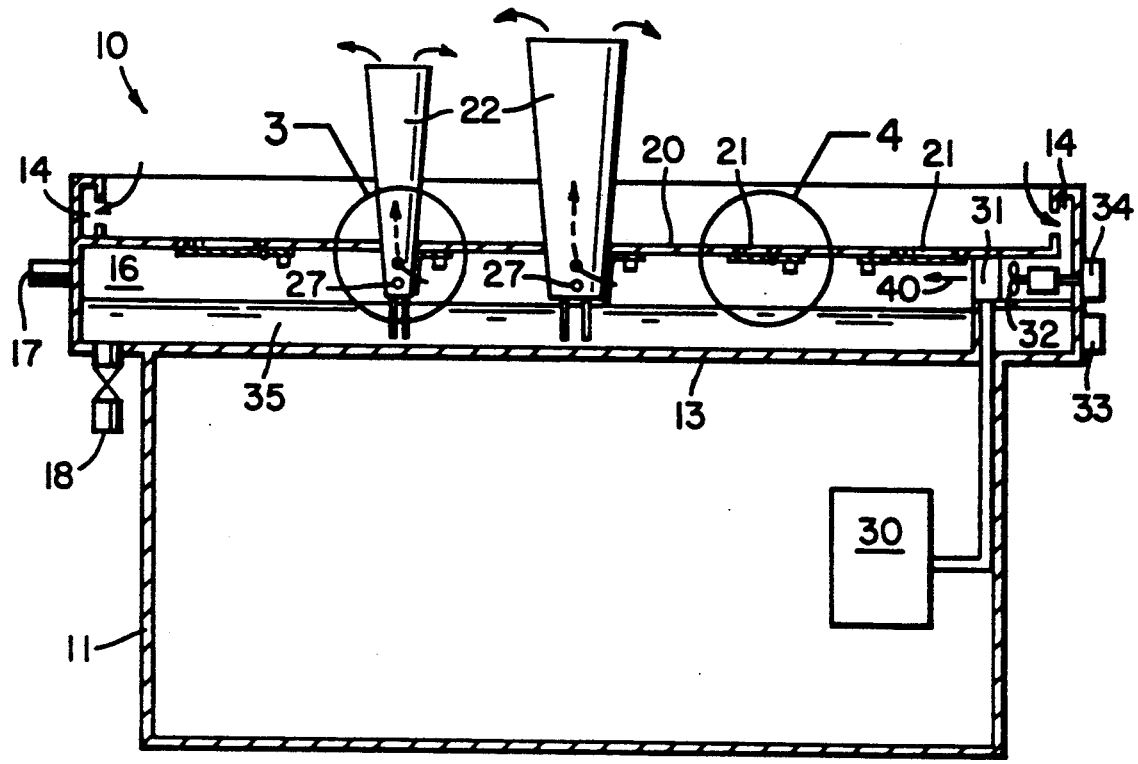
FIG. 2 is a cross-sectional view of the display cabinet taken along line 2—2 of FIG. 1.

As illustrated in FIGS. 1 and 2, the display cabinet 10 also includes an access door 15, which provides access into a refrigerated area 16, water intake 17 and water outlet 18 extending out from the insulated bottom 13. The water intake, water outlet and access door are utilized to provide the flowers in each product container with a fresh supply of water and to allow access into the refrigerated area for cleaning or other purposes.

A supply of water 35, provided through the water intake 17, covers the bottom of the refrigerated area 16.

Each of the product containers has a cut out bottom 26 which allows the stems of the flowers placed therein to be submerged in the supply of water 35 when the product container is inserted into one of the openings 21.

Additionally, the display cabinet includes a refrigeration system composed of a condensing unit 30, evaporator 31 and fan 32. The refrigeration system is controlled by a thermostat 33 and a fan speed control 34. The thermostat 33 is used to control the temperature of the air within the refrigerated area 16, while the fan speed control 34 regulates the flow of air produced by the fan 32. The fan speed control 34, which is electrically connected to each of the flap position sensing devices 28 and to the motor of the fan, receives an insertion signal 29 from each of the triggered position sensing devices and adjusts the speed of the fan accordingly. As is well known in the art, the speed of a fan motor is commonly controlled by a variable resistance device. As the resistance of the variable resistance device increases, the current available to the motor decreases, thereby decreasing the speed of the motor. In the preferred embodiment of the invention, the fan speed control comprises a switched resistive network controlled by the insertion signals 29. As the number of insertion signals increases, the overall resistance of the resistive network decreases and the speed of the fan increases accordingly.

Referring again to FIGS. 2 and 3, the bottom portion of each product container includes a plurality of holes 27. The holes are positioned on each product container in a manner such that they extend into the refrigerated area 16 below the foam ring 25 and above the supply of water 35 when a product container is inserted into an opening in the product support stand. As previously disclosed, the product containers can be formed out of plastic, foam or similar material or out of a deformable material such as cellophane or the like. The product containers can be preformed or can be constructed as needed by the owner of the display case.

The product containers can be constructed out of a sheet of deformable material such as cellophane containing a plurality of holes on a lower portion thereof. The sheet of material can be rolled into a conical shape while the flowers are inserted therein. The product container can then be inserted into one of the openings in the product support stand. The number of holes on the lower portion of the sheet is great enough so that there is sufficient overlapping of holes when the sheet is rolled into a cone to allow a flow of air to enter the cone and circulate upwards through the flowers.

In operation, the refrigeration system 30, 31 and 32 operates under the control of the thermostat 33 and fan speed control 34 to produce and maintain a flow of cold air 40 through the refrigerated area 16. Since the openings 21 which do not contain product containers are sealed by a flap 23 that is biased to the closed position, the flow of cold air is forced through the holes 27 in each inserted product container and upwards through the flowers stored therein, thereby providing the flowers with refrigeration. The velocity of the flow of cold air through the flowers is necessarily maintained at a level which avoids any damage to the flowers. After the cold air passes out of each inserted product container it is drawn back through the hollow air collection rim 14 into the refrigerated area 16 by the fan 32, thereby minimizing the loss of cold air to the outside environment.

The total flow of cold air through the refrigerated area 16 may be adjusted as the total number of product containers 22 inserted into the product support stand 20 increases or decreases in order to maintain the proper flow of cold air through the holes in each inserted product container. This is accomplished by the fan speed control which adjusts the speed of the fan in accordance with the total number of insertion signals 29 produced by the flap position sensing devices 28.

In the preferred embodiment of the invention, conical product containers are inserted into circular openings in the support stand 20. It should be obvious to those skilled in the art, however, that the size and shape of the product containers, as well as the size and shape of the corresponding openings in the product support stand are not limited to those described above.

Figure 5:
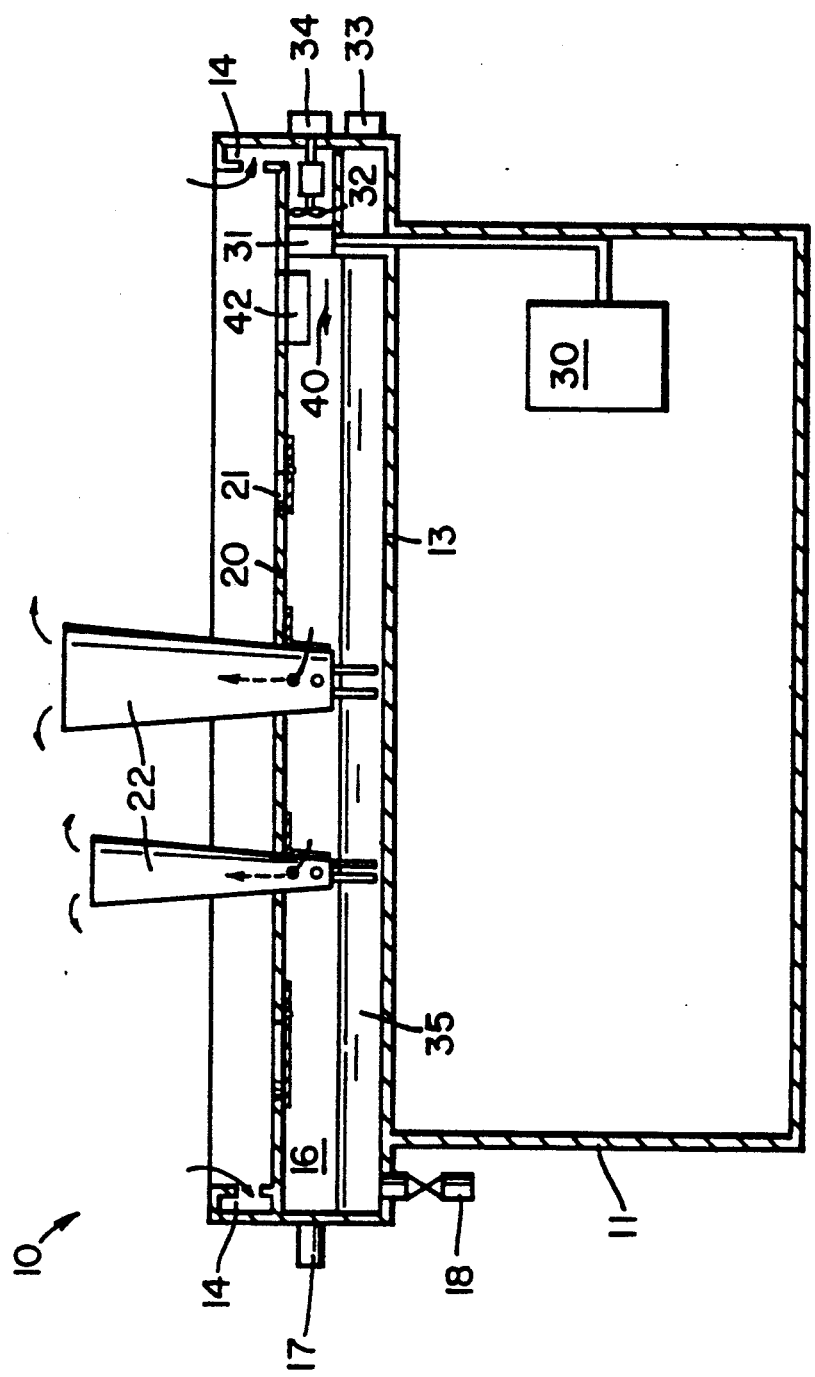
FIG. 5 is cross-sectional view of a refrigerated floral display cabinet according to a second embodiment of the invention.

A second embodiment of the invention is illustrated in FIG. 5. In this embodiment, the output of a pressure switch 42 is utilized by the fan speed control 34 in order to maintain a predetermined flow of air through the refrigerated area 16. In operation, the fan speed control 34 controls the speed of the fan 32 so as to maintain a predetermined pressure which will force the refrigerated air to flow up through the flower containers at the desired rate. In this embodiment, the flap position sensing devices 28 are not required.

In another alternate embodiment, a less expensive version of the refrigerated display cabinet could simply utilize a manual fan speed adjustment. In particular, the speed of the fan 32 is controlled by adjusting a dial having indicia corresponding directly to the number of inserted flower containers. In this embodiment, the flap position sensing devices are not required. In addition, a rheostat controlled by the dial is substituted for the switched resistive network.

In yet another embodiment of the invention, the flow of air produced by the fan 32 is cooled by adding ice to the water 35 covering the bottom of the refrigerated area 16. In this embodiment, the condenser 30, evaporator 31 and thermostat 33 are not required.

The foregoing description of the preferred embodiments of the invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

I claim:

1. A display cabinet for displaying and preserving containers of flowers comprising:
    means for providing a refrigerated area within said display cabinet;
    means for supporting said flower containers above said refrigerated area, said means for supporting including a plurality of openings therethrough which extend into said refrigerated area, each of said openings adapted to receive one of said flower containers therein, wherein a lower portion of each supported flower container extends into said refrigerated area and an upper portion of each supported flower container extends above said supporting means;
    means for automatically sealing the openings in said supporting means which do not have one of said flower containers inserted therein, said sealing means including a plurality of flap members and means for biasing each of said flap members against a corresponding one of said openings in said supporting means; and
    means for unsealing a sealed one of said openings in response to the insertion therein of one of said flower containers, a portion of said inserted flower container preventing the flap member corresponding thereto from resealing said unsealed opening.

2. The display cabinet of claim 1 wherein said display cabinet is adapted to support at least one flower container having at least one hole through said lower portion thereof.

3. The display cabinet of claim 2 further including:
    means for producing a flow of air through said refrigerated area, through said at least one hole in the lower portion of each supported flower container and upward through the flowers stored therein.

4. The display cabinet of claim 3 further including:
    means for determining the number of said flower containers which have been inserted into said means for supporting; and
    means for regulating the flow of air produced by said air flow producing means in accordance with the determined number of said inserted flower containers.

5. The display cabinet of claim 3 further including:
    means for determining the air pressure within said refrigerated area; and
    means for regulating the flow of air produced by said air flow producing means in accordance with said determined pressure.

6. The display cabinet of claim 1 wherein each said container is formed out of a sheet of deformable material.

7. A refrigerated display system including a display cabinet and a plurality of flower containers each of said flower container including at least one hole through a lower portion thereof, comprising:
    means for providing a refrigerated area within said display cabinet;
    means for supporting said flower containers above said refrigerated area, said means for supporting including a plurality of openings therethrough which extend into said refrigerated area, each of said openings adapted to receive one of said flower containers therein, said at least one hole through the lower portion of each supported flower container extending below said supporting means into said refrigerated area; and
    means for producing a flow of air through said refrigerated area, through said at least one hole in the lower portion of each supported flower container and upward through the flowers stored therein.

8. The refrigerated display system of claim 7 further including:
    means for sealing each of said openings which does not have one of said containers inserted therein.

9. The refrigerated display system of claim 8 wherein each said means for sealing comprises:
    a sealing member; and
    means for automatically securing said sealing member against said opening;
    whereby said sealing member is biased to a closed position against said opening by said means for securing when one of said containers is not inserted therein.

10. The refrigerated display system of claim 9 further including:
    means for determining the number of said flower containers which have been inserted into said means for supporting; and
    means for regulating the flow of air produced by said air flow producing means in accordance with the determined number of said inserted flower containers.

11. The refrigerated display system of claim 9 further including:
   means for determining the pressure within said refrigerated area; and
   means for regulating the flow of air produced by said air flow producing means in accordance with said determined 12. The refrigerated display system of claim 7 further including:
   means for determining the number of said flower containers which have been inserted into said means for supporting; and
   means for regulating the flow of air produced by said air flow producing means in accordance with the determined number of said inserted flower containers.

13. The refrigerated display system of claim 12 further including:
   means for determining the air pressure within said refrigerated area; and
   means for regulating the flow of air produced by said air flow producing means in accordance with said determined pressure.

14. The refrigerated display system of claim 7 wherein each said container is formed out of a deformable material.

* * * * *